(12) United States Patent
Henry et al.

(10) Patent No.: US 9,664,548 B2
(45) Date of Patent: May 30, 2017

(54) TESTING SYSTEM FOR PETROLEUM WELLS HAVING A FLUIDIC SYSTEM INCLUDING A GAS LEG, A LIQUID LEG, AND BYPASS CONDUITS IN COMMUNICATION WITH MULTIPLE MULTIPHASE FLOW METERING SYSTEMS WITH VALVES TO CONTROL FLUID FLOW THROUGH THE FLUIDIC SYSTEM

(71) Applicant: Invensys Systems, Inc., Foxboro, MA (US)

(72) Inventors: Manus P. Henry, Oxford (GB); Richard P. Casimiro, North Kingstown, RI (US)

(73) Assignee: Invensys Systems, Inc., Foxboro, MA (US)

( * ) Notice: Subject to any disclaimer, the term of this patent is extended or adjusted under 35 U.S.C. 154(b) by 259 days.

(21) Appl. No.: 14/663,183

(22) Filed: Mar. 19, 2015

(65) Prior Publication Data
US 2016/0273950 A1    Sep. 22, 2016

(51) Int. Cl.
*E21B 47/00* (2012.01)
*G01F 15/00* (2006.01)
(Continued)

(52) U.S. Cl.
CPC ............. *G01F 1/74* (2013.01); *E21B 47/00* (2013.01); *E21B 49/087* (2013.01); *G01F 1/84* (2013.01);
(Continued)

(58) Field of Classification Search
None
See application file for complete search history.

(56) References Cited

U.S. PATENT DOCUMENTS

| | | |
|---|---|---|
| 4,429,581 A | 2/1984 | Fumaga |
| 4,727,489 A | 2/1988 | Frazier et al. |

(Continued)

FOREIGN PATENT DOCUMENTS

| | | |
|---|---|---|
| WO | 0131298 A2 | 5/2003 |
| WO | 2006048418 A1 | 5/2006 |
| WO | 2006121480 A2 | 11/2006 |

OTHER PUBLICATIONS

Extended European Search Report for EP 16161297.3 dated Aug. 24, 2016.

*Primary Examiner* — Harshad R Patel
(74) *Attorney, Agent, or Firm* — Stephen Manella; Ralph Graham

(57) ABSTRACT

A well test system for testing fluids produced from one or more petroleum wells has a separator and a plurality of multiphase flow metering systems, each of which has the capability, over at least a portion of its operating envelope, of separately measuring flow rates of oil, water, and gas. The well test system has a fluidic system, including gas leg conduits coupling the separator to the multiphase flow metering systems, liquid leg conduits coupling separator to the multiphase flow metering systems, and bypass conduits for directing multiphase fluid to the multiphase flow metering systems while bypassing the separator. Valves are configured to selectively route fluid flow though the fluidic system to selectively bypass the separator when the multiphase flow metering systems can be used to provide separate flow rates of oil, water, and gas in the unseparated multiphase fluids from the well.

20 Claims, 11 Drawing Sheets

(51) Int. Cl.
   *G01F 15/08* (2006.01)
   *G01F 1/74* (2006.01)
   *E21B 49/08* (2006.01)
   *G01F 1/84* (2006.01)
   *G01F 15/18* (2006.01)

(52) U.S. Cl.
   CPC ............ *G01F 15/005* (2013.01); *G01F 15/08* (2013.01); *G01F 15/185* (2013.01)

(56) References Cited

U.S. PATENT DOCUMENTS

| | | | |
|---|---|---|---|
| 5,224,372 A | 7/1993 | Kolpak | |
| 5,256,171 A * | 10/1993 | Payne | B01D 19/0057 95/157 |
| 5,535,632 A | 7/1996 | Kolpak | |
| 5,654,502 A | 8/1997 | Dutton | |
| 6,032,539 A | 3/2000 | Liu et al. | |
| 6,134,951 A | 10/2000 | Scott et al. | |
| 6,212,948 B1 | 4/2001 | Ekdahl et al. | |
| 6,234,030 B1 | 5/2001 | Butler | |
| 6,272,915 B1 | 8/2001 | Kostelnicek et al. | |
| 6,286,367 B1 | 9/2001 | Segeral | |
| 6,318,156 B1 * | 11/2001 | Dutton | E21B 43/36 73/61.44 |
| 6,454,002 B1 | 9/2002 | Stokes et al. | |
| 6,499,344 B2 | 12/2002 | Nelson et al. | |
| 6,561,041 B1 | 5/2003 | Eck | |
| 7,474,969 B2 | 1/2009 | Poulisse | |
| 7,661,302 B2 | 2/2010 | Gysling | |
| 8,330,616 B2 | 12/2012 | Means et al. | |
| 2007/0006727 A1 * | 1/2007 | Gysling | G01F 1/36 95/1 |
| 2012/0222859 A1 | 9/2012 | Irani et al. | |
| 2014/0137642 A1 | 5/2014 | Henry et al. | |
| 2014/0137643 A1 * | 5/2014 | Henry | E21B 21/063 73/152.31 |
| 2015/0184511 A1 * | 7/2015 | Gordon | E21B 47/10 73/152.23 |

* cited by examiner (Prior Art)

(Prior Art)

TESTING SYSTEM FOR PETROLEUM WELLS HAVING A FLUIDIC SYSTEM INCLUDING A GAS LEG, A LIQUID LEG, AND BYPASS CONDUITS IN COMMUNICATION WITH MULTIPLE MULTIPHASE FLOW METERING SYSTEMS WITH VALVES TO CONTROL FLUID FLOW THROUGH THE FLUIDIC SYSTEM

FIELD OF INVENTION

The present invention relates generally to systems and methods for metering multiphase flows, and more particularly to systems and methods for metering flow from a multiphase fluid source, such as a petroleum well, that may produce a multiphase flow having variable content.

BACKGROUND

In the oil and gas industry, the output of a production well is usually a multiphase mixture of oil, water, and gas, commonly referred to as three-phase flow. The gas itself can be present in two forms: as free gas in the form of bubbles or slugs, or as dissolved gas tightly bound to the liquid. The relative proportions of free and dissolved gas vary with many factors, most notably pressure. Thus, for the same well production stream with constant mass flow rates of oil, water and gas, the proportion of gas coming out of solution to become free gas will increase as the line pressure decreases downstream. Accurate assessment of the output of each well is important for reservoir management, as well as for the payment of royalties and taxation.

The output of each petroleum well could be measured on a continuous basis with a dedicated metering system capable of monitoring the three phase simultaneously. Such a device is known as a three-phase flow meter. Unfortunately, it is at present uneconomic to meter wells individually using dedicated three-phase flow meters. As discussed below, the most widely used system for measuring three-phase flow is the separator, which physically separates at least the gas and the liquid. In many separator systems the oil and water are also separated. Separator systems are large and expensive, and it is uneconomic to provide a separator for each well. Instead, the industry has developed the practice of using well test stations, where the outputs of many wells are brought together to share a single multiphase measurement system, i.e. a test separator.

Referring to FIG. 1, a conventional well test separator selects 1 of N wells (where N is typically 6-60) and directs the multiphase flow from a well that has been selected for testing into a separator system so that the well output can be tested or measured. The outputs from all the unselected wells are typically pooled and sent unmeasured to the production facility, bypassing the test separator. Once the testing of the selected well is complete, a different well can be selected for testing. Thus, all N wells can eventually be tested one at a time using the conventional test separator.

FIG. 2 shows a conventional separator system in more detail. The multiphase flow is directed into a separator vessel, which has sufficient capacity to enable the gravimetric separation of at least the liquid (e.g., oil and water) from the gas. Other separator designs have additional features to enable the further separation of the oil from the water. The separated gas rises, and is piped away on the "gas leg" to be metered by a suitable gas flow measurement device, such as a vortex meter or a Coriolis mass flow meter. Similarly, the liquids are piped away on the "liquid leg" to be metered by a suitable liquid flow measurement device, such as a positive displacement meter, a vortex meter, or a Coriolis mass flow meter. Further measurements can be taken to determine the 'water cut', or proportion by volume of water within the liquid mixture, so that the individual oil and water flow rates can be calculated. For example, a water cut meter can be incorporated into the liquid leg. Alternatively, if a Coriolis meter is used to meter the liquid, its density reading can be used to determine the water cut.

A range of techniques, familiar to those skilled in the art, may be used to manage the separation and measurement of the liquid and gas streams by conventional separator systems. Typically, level and/or pressure control is used. For example, the level of the liquid in the separator may be maintained between an upper and lower limit, or the pressure at the top of the separator may be maintained between an upper and lower pressure limit, or some combination of the two may be implemented. Flow out of the separator through the liquid and/or gas legs may occur continuously or in batches, depending upon the control scheme implemented. In any event, phase separation entails gravimetric separation of the various constituents of the multiphase flow, which requires the separator tank or vessel to be large enough to provide a suitable setting time for allowing gravimetric separation of the fluids. Because of the settling time in the separator vessel, there is no way to correlate instantaneous gas or liquid flow rate measurements with any instantaneous flow rates into the separator vessel. In other words, there is no way to correlate the instantaneous oil, water and gas flow rates of the well being tested with the instantaneous flow outputs from the separator.

For example, FIG. 3 shows the observed flow pattern from a conventional separator as it monitors an oil and gas well over a two hour test period. The upper plot shows the flow measurement reported on the liquid leg, in tons per day (t/d), while the lower graph shows the reported flow measurement on the gas leg, in standard cubic meters per day. In this example, the separator control scheme operates so that liquid normally flows through the liquid leg meter, but from time to time (for example when the pressure in the separator reaches an upper limit) a gas purge takes place, where the liquid leg is shut off and the gas leg is opened up to expel gas from the separator and meter the gas. Each gas purge is characterized by an initial spike in gas flowrate, followed by a sharp decline and then a more gradual decline. When the separator pressure drops to its lower limit, the gas leg is closed and the liquid leg is reopened.

Over a sufficiently long period the flow entering the separator must equal the flow leaving the separator. However, the original flow behavior from the well is largely destroyed by the separation process. The pattern of flow exiting the separator and recorded by the gas and liquid meters is mostly determined by the separator control scheme, not the pattern of flow entering the separator. For example, it is likely that the gas flow rate from the well is more continuous than the pattern of gas purges observed in the gas leg. Thus, no real-time information on the pattern of well flow is provided by this conventional separator system. Typically, therefore, for each well test, only the totalized flows of gas and liquid (sometimes further distinguished as oil and water) are reported, along with the totalized time. Thus, a separator can be used to determine average flow rates for each of the phases, but not the dynamic flow behavior.

A further limitation of separators, which follows from this interrupted pattern of flow, is that a long testing period is often necessary to ensure accurate measurements. For example, in FIG. 3, the time delay between gas purges is up to 50 minutes. If the test had been completed immediately before the final gas purge, say at 11:30, the average gas flow rate reported would have been quite different. Thus, given that the gas and/or liquid streams may leave the separator in a series of cycles, it is important to ensure the test period is long enough to have sufficient separator cycles so that incomplete cycles at the beginning or end of the test period do not introduce significant errors. When switching between wells that are being tested, it also is important to set aside sufficient time to flush the separator through completely with the new well stream before starting a new test or additional measurement errors will be introduced. These issues limit the ability to test wells quickly.

FIG. 4 illustrates another problem that can occur when using a conventional test separator. If gas/liquid separation is incomplete (e.g., if an emulsion is formed, or if the separator is undersized for the well flow rate), then gas carry under and/or liquid carry over may take place. Gas carry under occurs when gas leaves the separator through the liquid leg. Liquid carry over occurs when liquid leaves the separator through the gas leg. FIG. 4 shows liquid carry-over occurring at the very start of a test period, in data collected from the same separator with the same control schemes as shown in FIG. 3. The top graph shows the liquid flow rate leaving the separator, which is essentially steady other than the regular drops in flow when the liquid leg is closed for gas purges. The middle graph shows the gas flow rate reading from a Coriolis mass flow rate meter on the gas leg. There are regular bursts of gas flow coinciding with each of the pauses in liquid flow, as expected, but the graph is dominated by the first burst of gas occurring at time 16:25. The bottom graph shows the density reading from the Coriolis meter on the gas leg. The density time series demonstrates that for much of the test the density is around 30 kg/m3, which is the expected value for the gas composition and the operational pressure. However, at the initial purge of gas at time 16:25, the density rises to above 400 kg/m3. This can only have been caused by liquid carry-over, where liquid is carried through into the gas leg, resulting in a very high density reading from the Coriolis meter on the gas leg. In this case the liquid carry over appears to cause a large over-reading of the gas mass flow before the end of the liquid carry over event. Similarly, in the case of gas carry under, when gas/liquid separation is incomplete it is possible for some gas to be passed through the liquid leg, which may introduce errors in the liquid flow meter. Gas carry under in the liquid leg can be detected by density readings from the liquid leg that are too low.

A related potential problem with the conventional separator arrangement in FIG. 2 concerns the effects of dissolved gas. As is well known to those familiar with the industry, natural gas readily dissolves in oil. The amount of gas dissolving in the oil is a function of several parameters, including temperature and pressure. Specifically, at higher pressures more gas can be dissolved into a given volume of oil. Accordingly, at each stage of the upstream oil and gas production process, whenever the pressure decreases, some gas will be released from solution in the oil. Thus, even when there is no gas carry under, the pressure drop across the liquid meter will induce a proportion of gas to come out of solution, and in that sense the fluid measured in the liquid leg is not purely liquid because of the gas therein. Even small amounts of gas coming out of solution can cause significant measurement errors in some conventional liquid phase meters, for example some conventional Coriolis meters.

Moreover, each separator is typically used to test the outputs from many wells, and so must be designed to deal with the range of flow conditions across all these wells, as characterized by liquid volumetric flowrate, water cut, GVF, pressure and other parameters. Choosing the most appropriate capacity for a separator, given the set of wells to be tested, is a matter of balancing different considerations. It is desirable to minimize the separator size in order to keep the cost of construction as low as possible. However, if the capacity of the separator is too small for high flowing wells, the separation process may be incomplete, leading to liquid carry over and/or gas carry under with the likelihood of measurement errors induced in the gas and liquid leg flow meters. On the other hand, if the capacity of the separator is too large, then for low flowing wells the test period may need to be significantly extended to ensure sufficient separator gas purge cycles for the desired measurement accuracy. In practice, a single separator can be used in the industry to measure a well cluster with a wide range of well flow rates—for example a ratio of 20:1—between the highest and lowest liquid flow rate. However, the need to accommodate a wide range of flow rates does limit the options available for well testing.

The present inventor has developed systems and methods that improve on the conventional systems described above and which will be described in detail below.

SUMMARY

One aspect of the invention is a system for testing production of fluids by one or more petroleum wells. The system includes a separator. The separator has an inlet for receiving a multiphase fluid flow from a petroleum well, a vessel for containing fluids received through the inlet, a liquid outlet, and a gas outlet. The gas outlet is positioned at a higher elevation on the vessel than the liquid outlet. The system also includes first and second multiphase flow metering systems. Each of the first and second multiphase flow metering systems has the capability, over at least a portion of its operating envelope, of separately measuring flow rates of oil, water, and gas through the respective flow metering system. The system also includes a fluidic system that has: (i) gas leg conduits fluidically coupling the gas outlet of the separator to the first and second multiphase flowmeters; (ii) liquid leg conduits fluidically coupling the liquid outlet of the separator to the first and second multiphase flow metering systems; (iii) bypass conduits plumbed to direct multiphase fluid through the fluidic system to the first and second multiphase flow metering systems without flowing the fluid through the separator to thereby bypass the separator; and (iv) a plurality of valves configured to selectively control routing of fluid flow though the fluidic system.

Another aspect of the invention is a system for testing production of fluids by individual petroleum wells in a group of N petroleum wells. The system has a fluidic system for receiving multiphase fluid output from the wells. The system also has a fluid measurement system configured to measure flow rate of oil, water, and gas through the fluidic system. The fluid measurement system is operable in a first mode in which the measurement system provides time-varying measurements of individual flow rates for oil, water, and gas received by the fluidic system, wherein the time-varying measurements generally correspond to instantaneous flow rates of oil, water, and gas into the fluidic systems. The fluid measurement system is also operable in a second mode in which the measurement system separates gas from the oil and water and provides flow measurements of oil, water, and gas generally corresponding to at least one of: (i) total flow over a period of time; and (ii) average flow rate over a period of time. The system has a control system configured to selectively and sequentially route the output of one or more wells selected from the group of N wells to the fluidic system to perform a series of well tests on the wells. The control system is further configured to cause the measurement system to switch between the first and second modes in response to a change in operating conditions.

Yet another aspect of the invention is a method of testing fluids produced by individual petroleum wells in a group of N petroleum wells. The method includes routing fluid from one or more wells selected for testing to a well test system. The well test system including a separator vessel, a plurality of multiphase metering systems, and a fluidic system for receiving multiphase fluid output from the one or more wells. The method also includes determining whether or not the plurality of multiphase metering systems can, either individually or collectively, provide individual measurements of oil, water, and gas. The fluid is selectively routed to the separator vessel when it is determined the plurality of multiphase metering systems cannot provide individual measurements of oil, water, and gas. The fluid is selectively routed directly to one or more of the plurality of multiphase metering units, bypassing the separator, when it is determined the multiphase metering units can provide individual measurements of oil, water, and gas.

Other objects and features will in part be apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
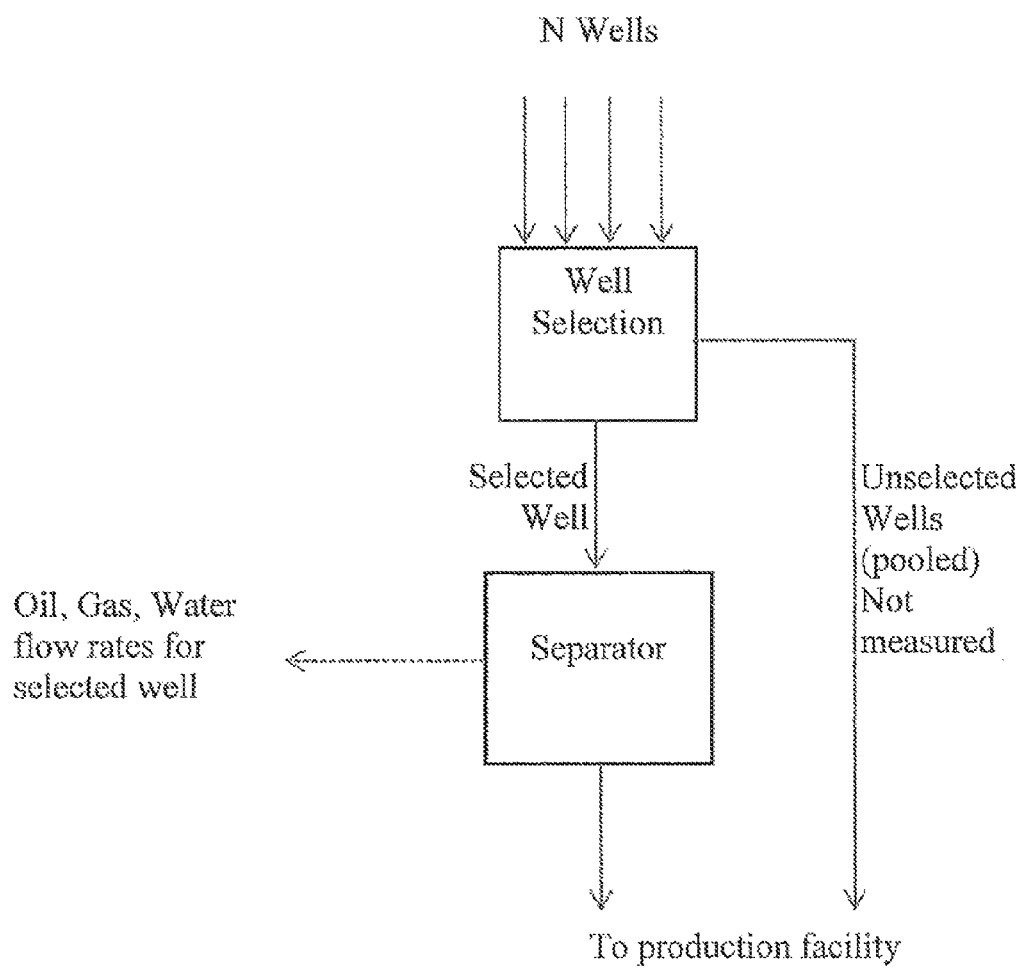
FIG. 1 is a schematic diagram of a prior art test separator system being used to test multiphase output from one well selected from a group of N wells.
Figure 2:
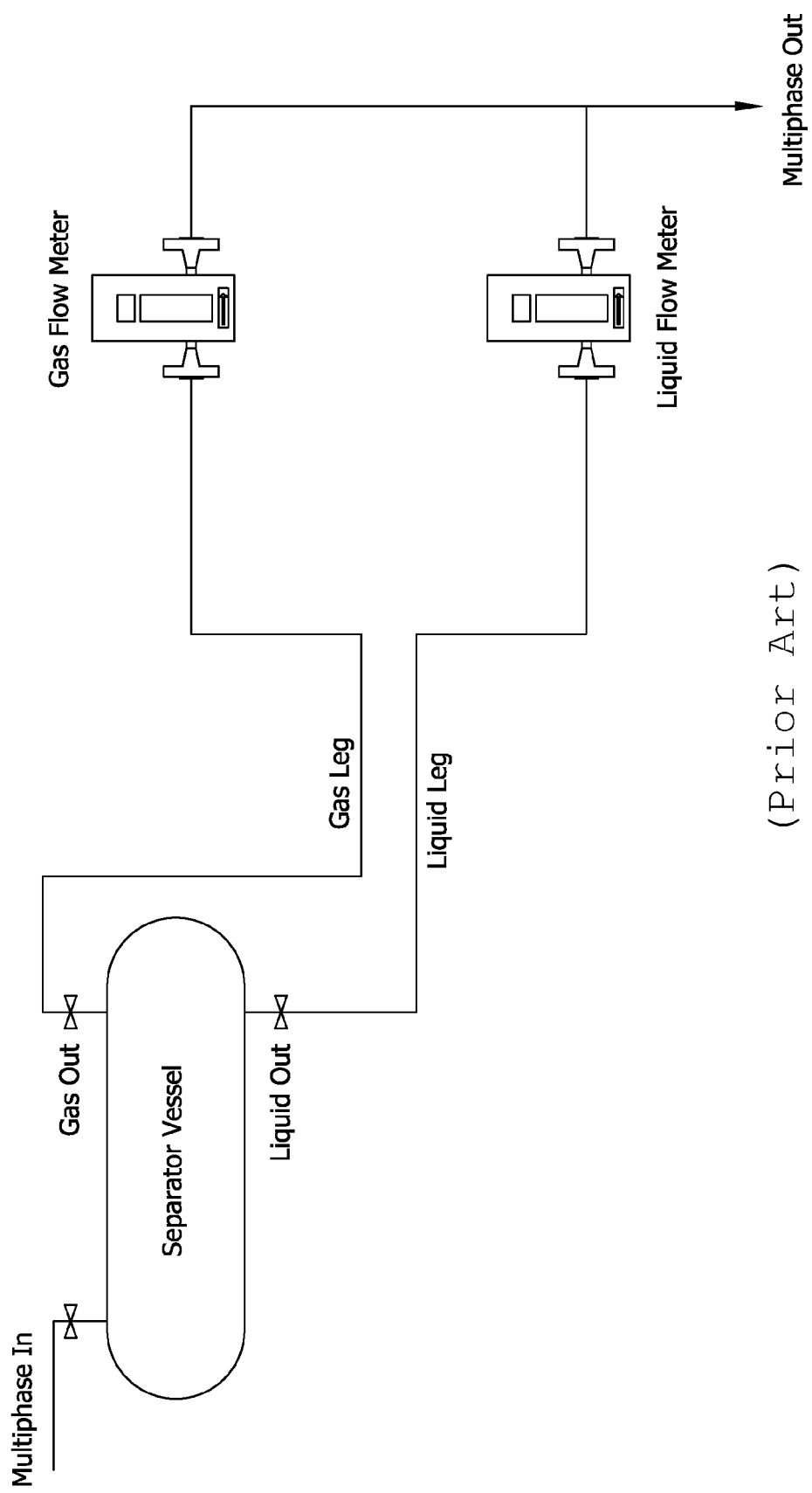
FIG. 2 is a schematic diagram of the test separator from FIG. 1.
Figure 3:
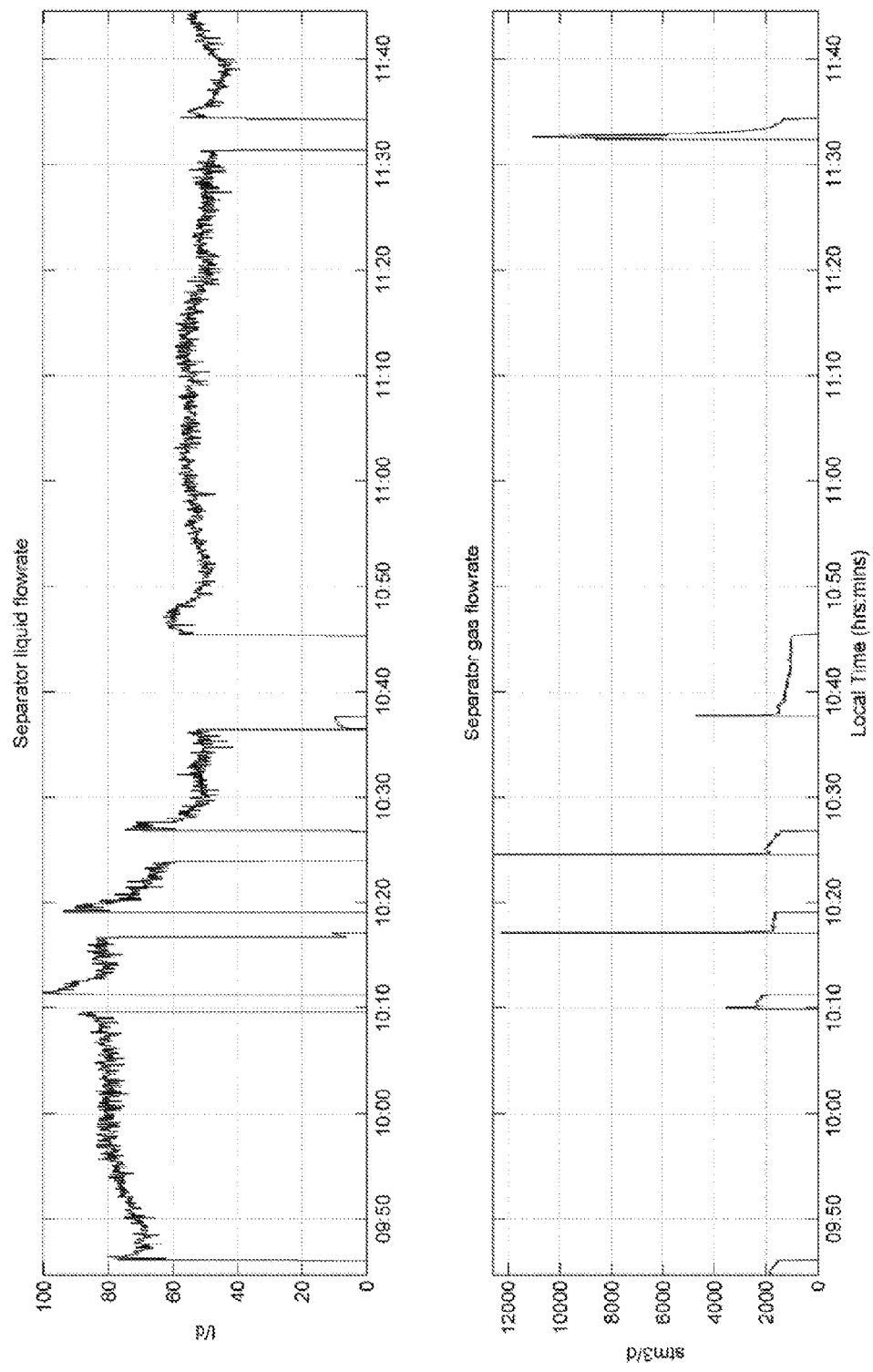
FIG. 3 is a set of graphs illustrating flow rates of gas and liquid from the test separator in FIG. 2 during a well test.
Figure 4:
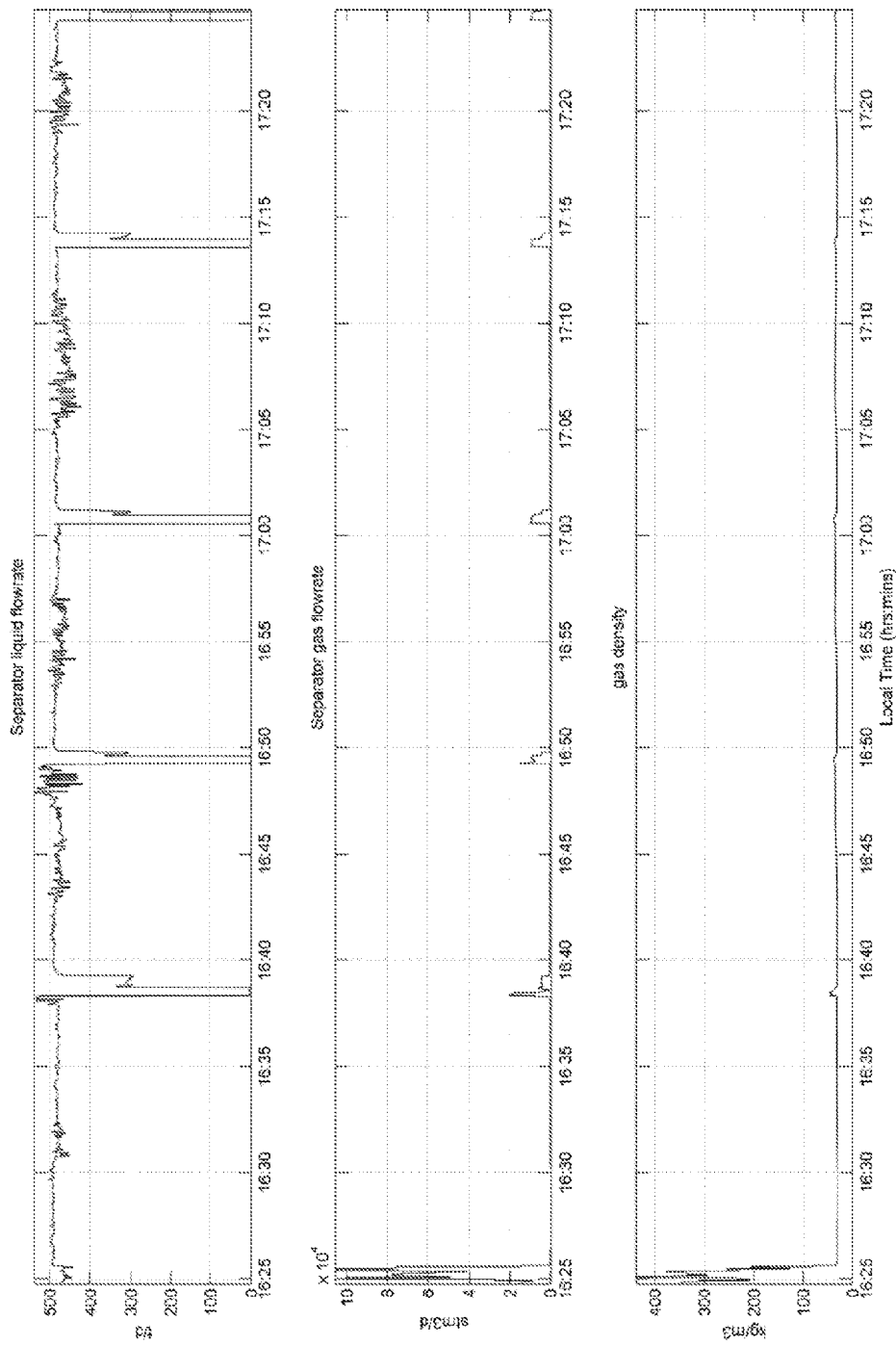
FIG. 4 is a set of graphs illustrating flow rates of gas and liquid as well as measured "gas" density during a liquid carry over event.
Figure 5:
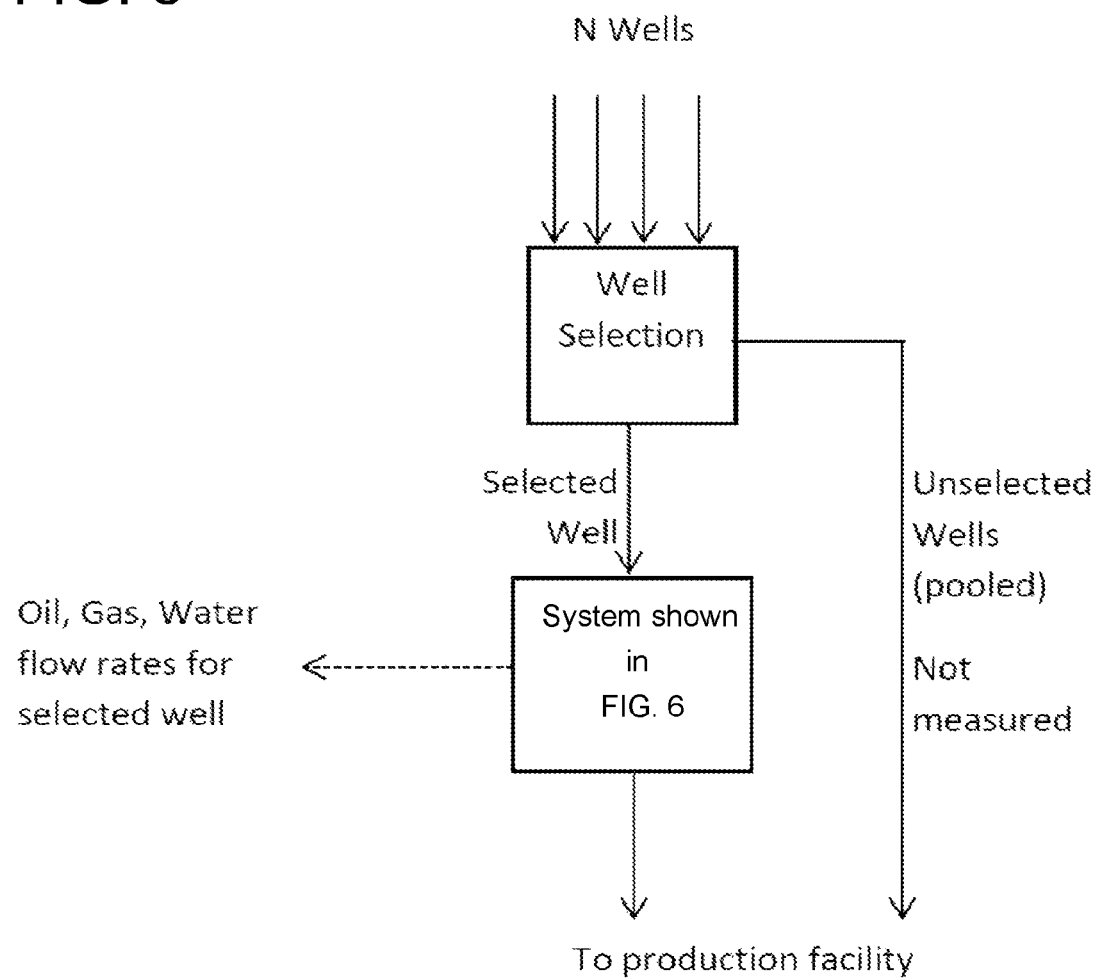
FIG. 5 is a schematic diagram of one embodiment of a multiphase test system of the present invention being used to test a selected well from a group of N wells.
Figure 6:
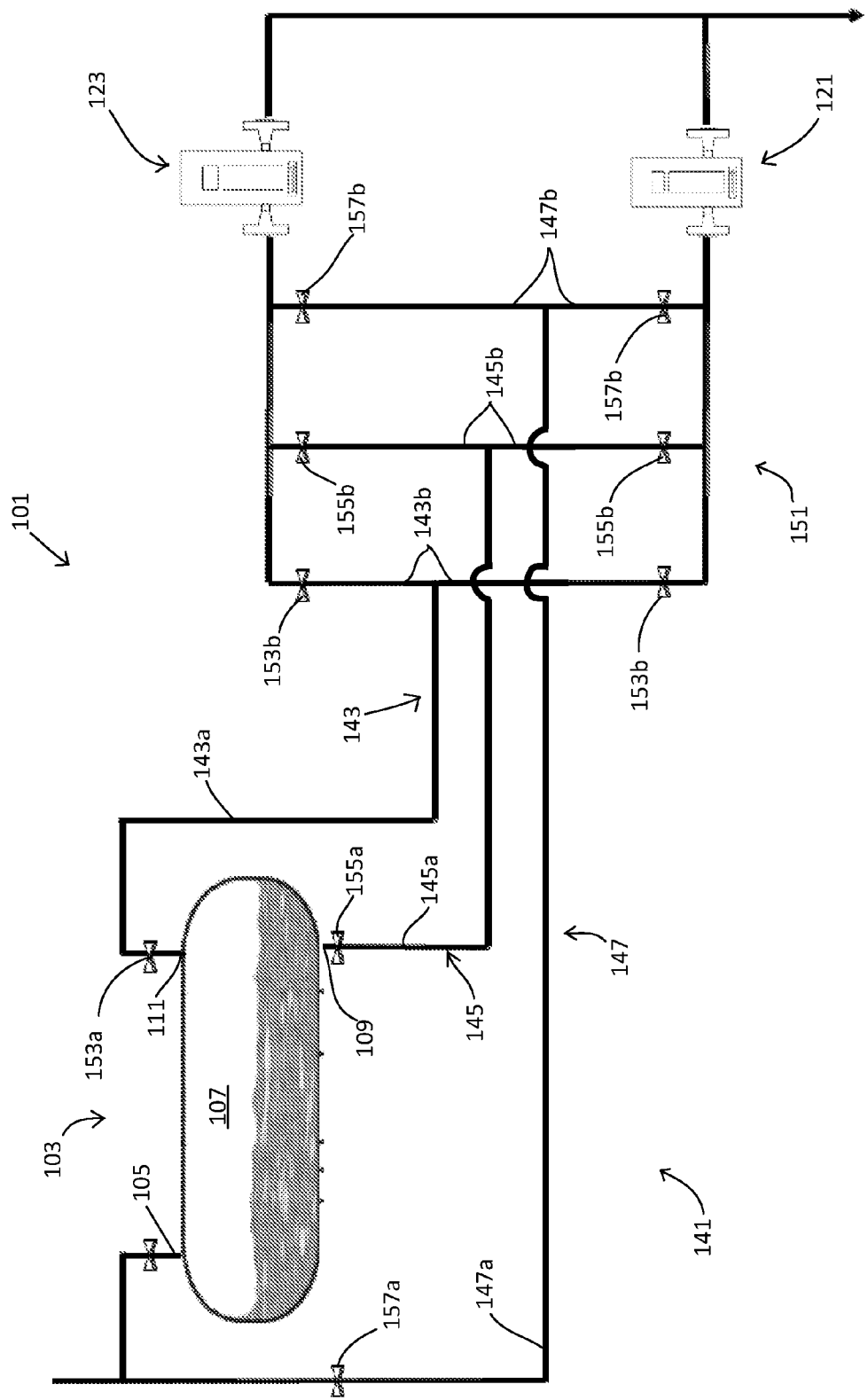
FIG. 6 is a schematic diagram illustrating the multiphase test system in more detail.

Referring now to the drawings, first to FIGS. 5 and 6, one embodiment of a system for testing fluids produced by one or more petroleum wells in a cluster of N wells is generally designated 101.

The system includes a separator 103, as illustrated in FIG. 6. In general, any device that separates gas from liquids using gravity can be used as the separator. For example, any conventional separator can be used as the separator in the system. As illustrated in FIG. 6, the separator 103 includes an inlet 105 for receiving a multiphase fluid flow from a petroleum well and a vessel 107 for containing fluids received through the inlet. The separator 103 also includes a liquid outlet 109 and a gas outlet 111. The gas outlet 111 is positioned at a higher elevation on the vessel 107 than the liquid outlet 109. In particular, the liquid outlet 109 is suitably positioned near the bottom of the vessel 107 to facilitate draining liquid completely from the vessel and to limit the potential for gas carry under. The gas outlet 111 is suitably positioned near the top of the vessel 107 for discharging gas from the vessel while limiting the potential for liquid carry over.

In addition to the separator 103, the system also includes a plurality of multiphase flow metering systems 121, 123. Each of the multiphase flow metering systems 121, 123 has the capability to receive a multiphase flow containing oil, water, and gas and provide separate flow rate measurements for flow of oil, water, and gas therethrough over at least a portion of its operating envelope. For example, one or both of the multiphase flow metering systems 121, 123 can suitably include a multiphase Coriolis meter, such as the Coriolis flowmeters described in U.S. Pat. Nos. 6,311,136; 6,505,519; 6,950,760; 7,059,199; 7,614,312; 7,660,681; 7,617,055; the contents of which are each hereby incorporated by reference. One or both of the multiphase metering systems 121, 123 can also include a water cut meter that measures the amount of water in the multiphase flow in combination with a Coriolis flowmeter or other type of flowmeter that is operable to measure liquids (e.g., oil and water) separately from gas.

Figure 7:
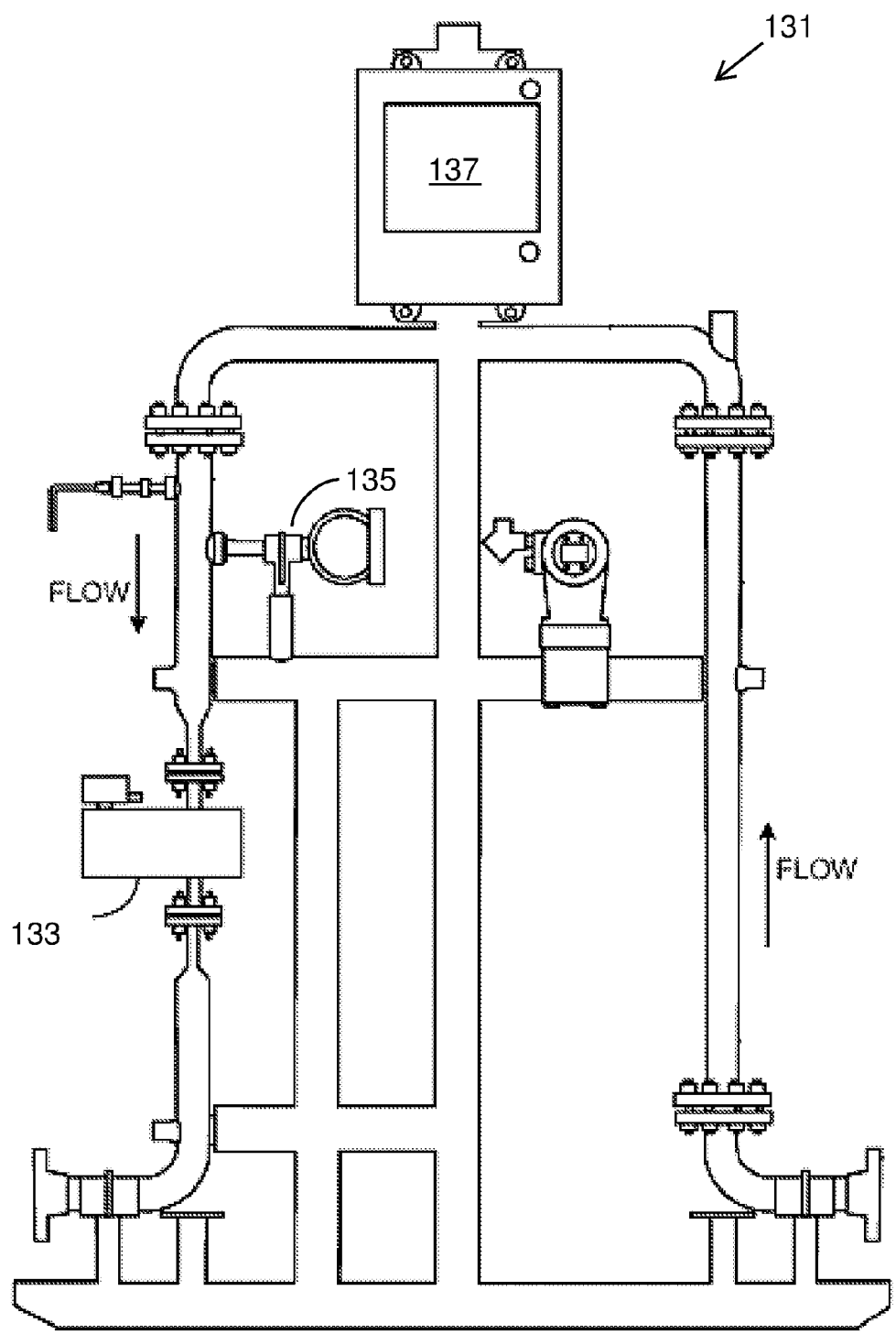
FIG. 7 is a front elevation of one embodiment of a net oil skid that can be used to measure flow rate of individual components of a three-phase flow from the separator of the multiphase test system illustrated in FIGS. 5 and 6.
Figure 8:
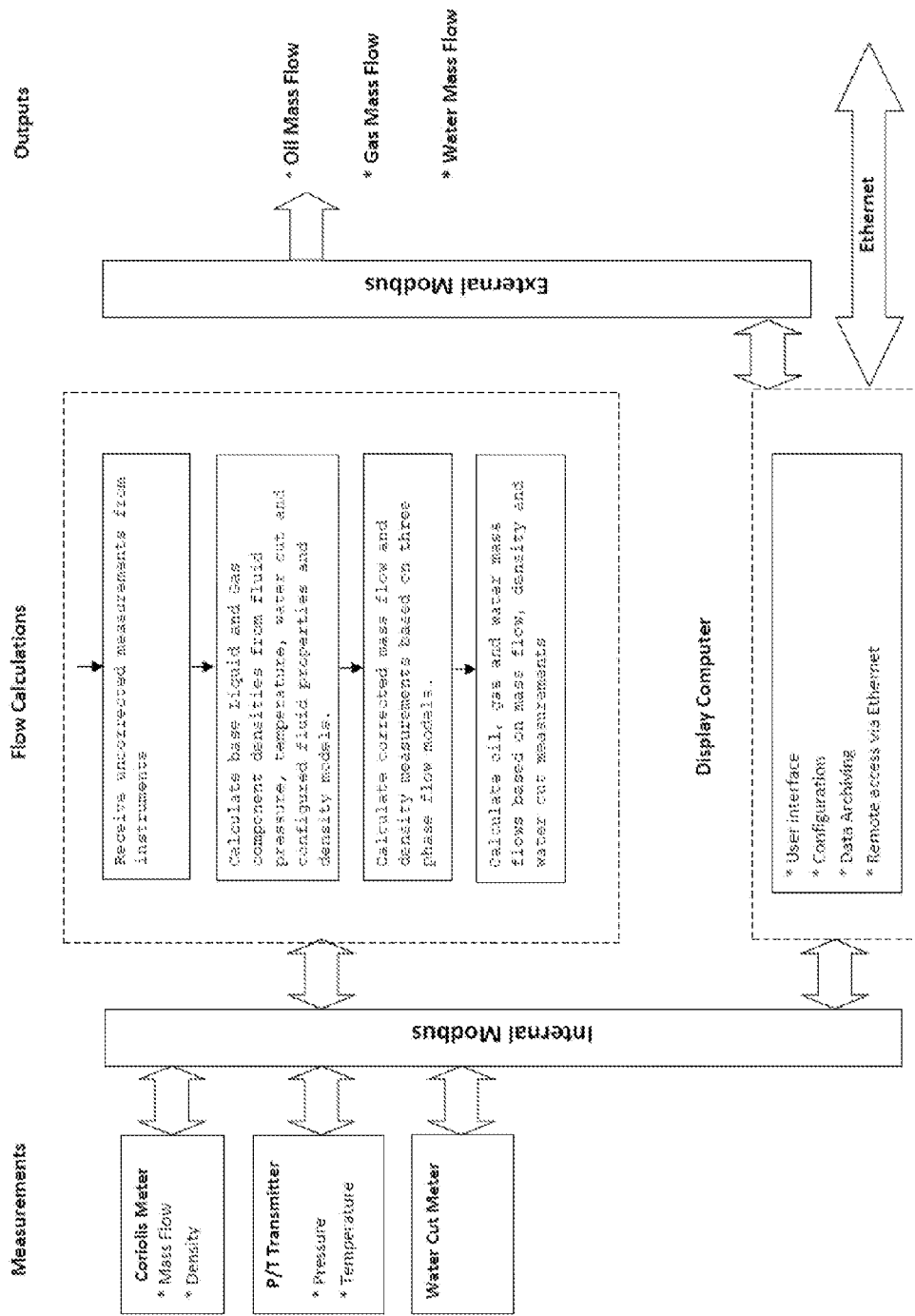
FIG. 8 is a schematic diagram illustrating one embodiment of an electronic architecture for the net oil skid illustrated in FIG. 7.
Figure 9:
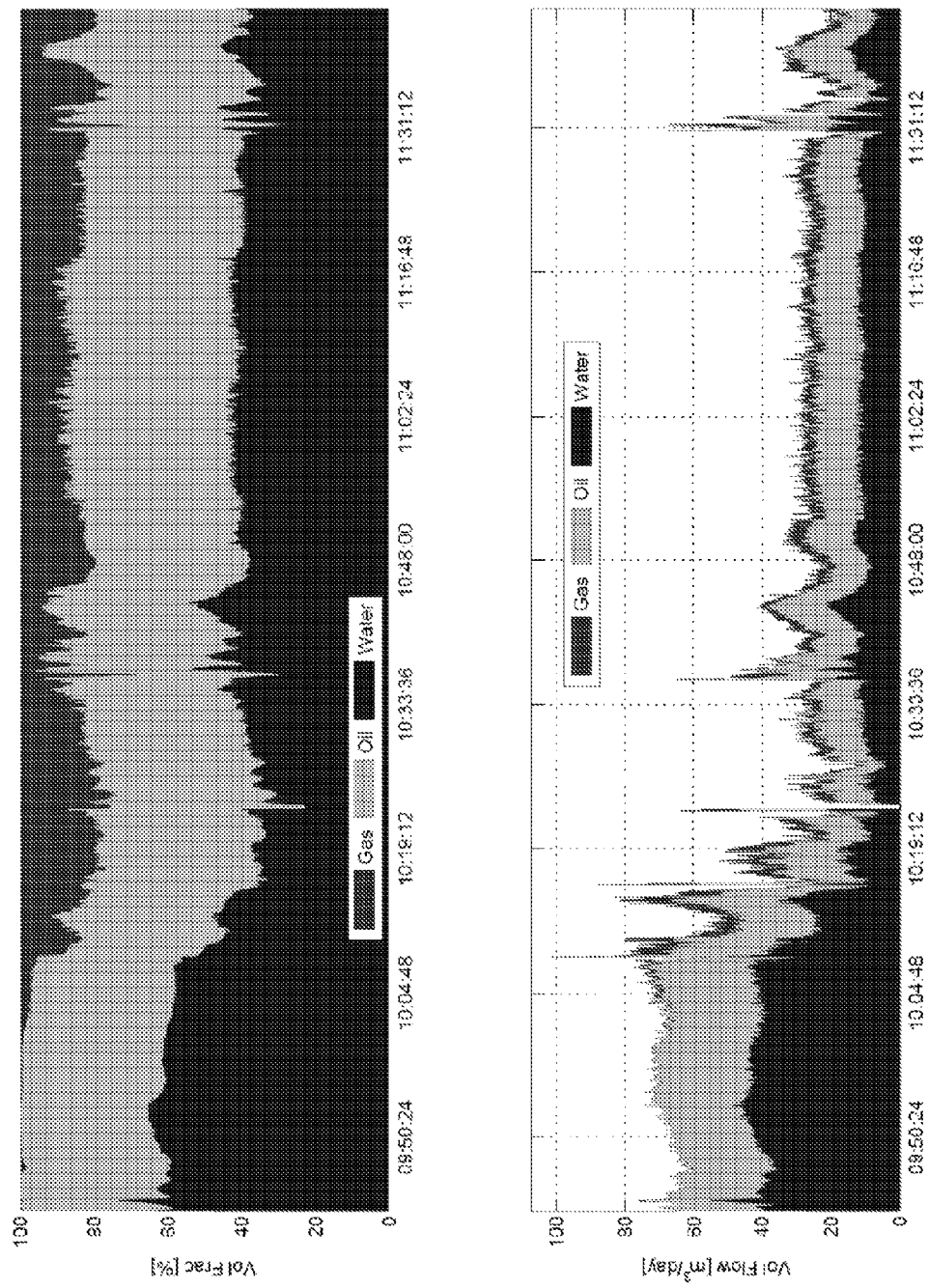
FIG. 9 is a set of graphs illustrating volumetric fraction for each constituent of a three-phase flow from a petroleum well and flow rate for each constitute of the three-phase flow.
Figure 10:
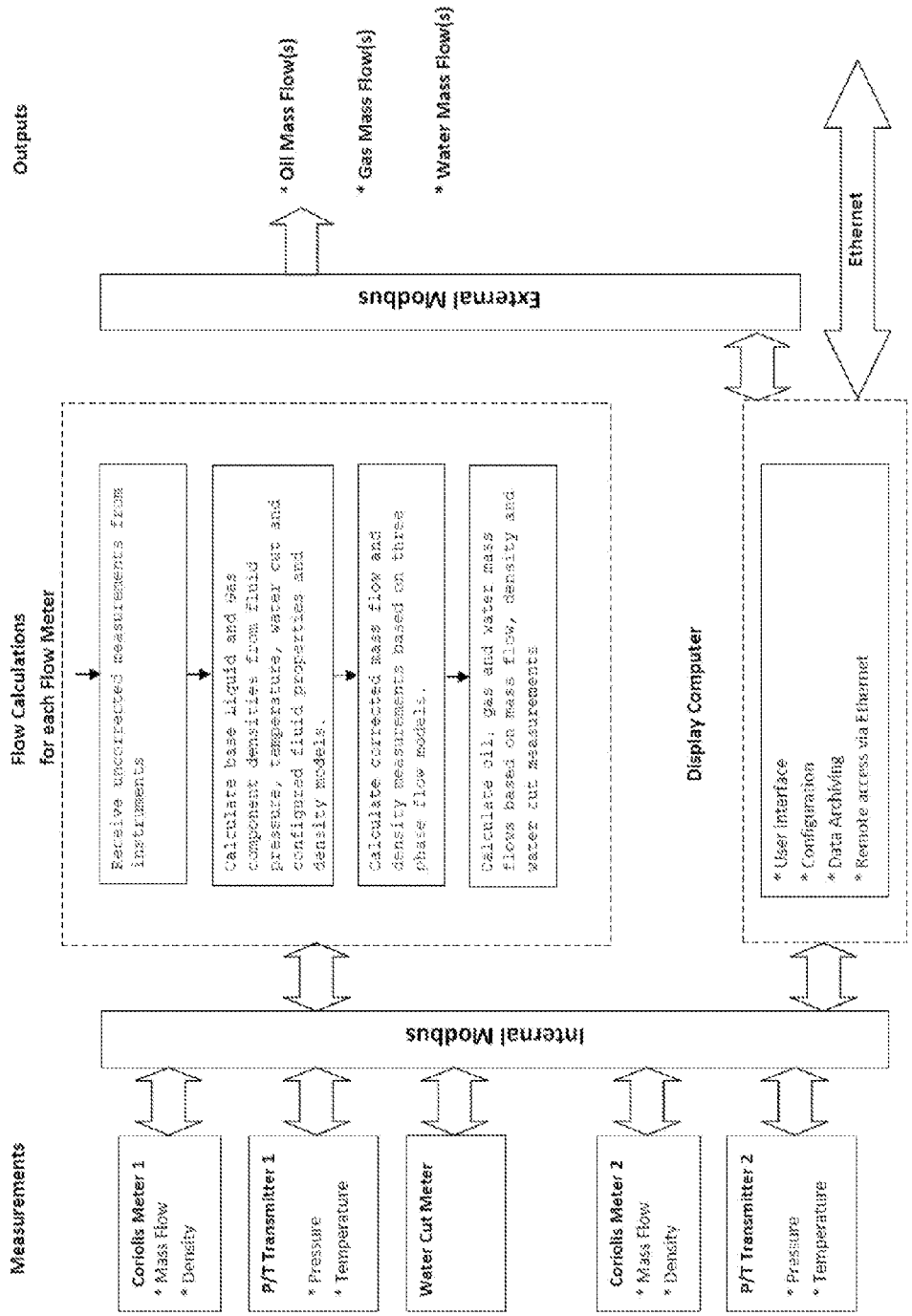
FIG. 10 is a schematic diagram illustrating one embodiment of an electronic architecture suitable for use in a multiphase test system, such as the multiphase test system illustrated in FIG. 6.

FIG. 7 illustrates one embodiment of a multiphase metering system 131 that is suitable for use in the system 101. The multiphase metering system 131 illustrated in FIG. 7 is generally known as a net oil skid. The net oil skid 131 in the illustrated embodiment includes a multiphase Coriolis flowmeter 133 in series with a water cut meter 135. Together the Coriolis meter 133 and water cut meter 135 can provide independent measurement of oil, water, and gas flow through the net oil skid 131. For example, the multiphase Coriolis meter 133 can suitably provide separate flow rate measurements for the gas phase and the combined liquid phases (e.g., flow rate of oil plus flow rate of water) while the water cut meter 135 can provide a measurement indicating the percentage of water in the combined liquid phases. Thus, the information provided by the Coriolis and water cut meters 133, 135 enables determination of independent flow rates for each constituent of the three phase oil, water, and gas mixture produced by one or more of the petroleum wells. For example, each net oil skid 131 may include a net oil computer 137 that receives information from the Coriolis meter 133 and also from the water cut meter 135 and computes the flow rates for oil, water, and gas through the net oil skid 131 based on that information.

Alternatively, a single net oil computer may be shared by a plurality of multiphase metering systems 131 within the scope of the invention. For example, each of the flow metering systems 121, 123 of the system illustrated in FIG. 6 can be a net oils skid as illustrated in FIG. 7 and they may share a single net oil computer 137. It is understood that different arrangements of Coriolis meters and water cut meters can be used.

It is not required that the multiphase flow metering systems be able to provide three phase flow measurements under all types of conditions. For example, some Coriolis flowmeters provide suitable measurements when operating under low to moderate gas void fraction conditions (e.g., about 50% GVF or less) but do not operate as well under high gas void fraction conditions (e.g., more than about 50% GVF). Although each of the flowmeters 121, 123 in the illustrated embodiment includes a Coriolis flowmeter 133 in combination with a water cut meter 135, it is understood that Coriolis meters are not required to practice the invention and other types of multiphase flowmeters could be used instead without departing from the broad scope of the invention. It is conceivable that other types of multiphase metering systems may need a different set of operating conditions in order to provide suitably independent measurements of the flow rates for oil, water, and gas.

The multiphase metering systems 121, 123 can provide total flow measurements for the total amount of oil, water, and/or gas flowing therethrough even when the operating conditions are outside the envelop that is suitable for operation in multiphase mode. In other words, each of the multiphase metering systems 121, 123 suitably has a narrower operating envelop within which they can be operated to provide dynamic multiphase measurements of each component of a three phase mixture of oil, water, and gas and also a broader operating envelop within which they can at least provide useful total flow measurements even if they are outside the narrower envelop that allows measurement of individual flow rates of oil, water, and gas.

For reasons that will become apparent, it may be desirable for each of the multiphase flow metering systems to have a different maximum flow rate capacity. For example, in a system having two multiphase flow metering systems one of the multiphase flow metering systems suitably has a relatively higher maximum flow rate capacity while the other has a relatively lower maximum flow rate capacity. The multiphase flow metering systems can suitably have different minimum flow rates as well. For example, referring to the embodiment illustrated in FIG. 6, one of the multiphase metering systems 121 suitably has an operating range from about 1 to about 5 units while the other 123 has an operating range from about 5 to about 20 units. In this embodiment, there is no gap between the operating ranges for the metering systems 121, 123. Similarly, the multiphase flow metering systems 121, 123 can be used, either collectively or individually, to measure any total flow rate between the lowest minimum flow rate for the smaller capacity system (e.g., 1 unit) to the sum of the maximum flow rates for both systems (e.g., 25 units).

A fluidic system 141 connects the separator 103 to the multiphase flow metering systems 121, 123. As illustrated in FIG. 6, for instance, gas leg conduits 143 fluidicly couple the gas outlet 111 of the separator 103 to the first and second multiphase flow metering systems 121, 123. Liquid leg conduits 145 fluidicly couple the liquid outlet 109 of the separator 103 to the first and second multiphase flow metering systems 121, 123. The fluidic system 141 in FIG. 6 also includes bypass conduits 147 plumbed to direct multiphase fluid through the fluidic system to the first and/or second multiphase flow metering systems 121, 123 without flowing the fluid through the separator 103 to thereby bypass the separator. The fluidic system 141 also includes a plurality of valves 151 configured to selectively control routing of fluid flow though the fluidic system.

In the embodiment illustrated in FIG. 6, for example, the gas leg conduits 143 include an upstream conduit 143a and a set of downstream conduits 143b arranged so each of the multiphase flow metering systems 121, 123 is connected to the upstream gas leg conduit 143a by one of downstream gas leg conduits 143b. Thus, in FIG. 6 for example the gas leg conduits 143 include two downstream gas leg conduits 143b branching from the upstream gas leg conduit 143a because there are two multiphase flow metering systems 121, 123. The number of downstream gas leg conduits could be increased to accommodate additional multiphase flow metering systems. Similarly, the liquid leg conduits 145 also include an upstream conduit 145a and a set of downstream conduits 145b arranged so each of the multiphase flow metering systems 121, 123 is connected to the upstream liquid leg conduit 145a by one of the downstream liquid leg conduits 145b. Again, additional downstream liquid leg conduits could be added to accommodate additional multiphase flow metering systems, if desired. Likewise, the bypass conduits 147 also include an upstream conduit 147a and a set of downstream conduits 147b arranged so each of the multiphase flow metering systems 121, 123 is connected to the upstream bypass conduit 147a by one of the downstream bypass conduits 147b.

Still referring to FIG. 6, the plurality of valves include a set of valves 153a, 153b in the gas leg conduits 143 that control flow of fluid through the gas leg conduits. One of the valves 153a in the gas leg conduits is positioned in the upstream gas conduit 143a (e.g., near the separator 103) and is configured to selectively open the gas leg conduits 143 for receiving flow from the gas outlet 111 into the upstream gas leg conduit 143a. Further, each of the downstream gas leg conduits 143b has a valve 153b that is configured to selectively open and close the respective downstream gas leg conduits 143b. Thus, the valves 153b in the downstream gas leg conduits 143b are operable to selectively route fluid flow from the upstream gas leg conduit 143 to one or more of the multiphase flow metering systems 121, 123. For example, the valves 153b in the downstream gas leg conduits can be operated to switch flow through the gas leg conduits 143 back and forth from one of the multiphase flow metering systems 121, 123 to the other to reroute the flow of fluid through the gas leg conduits 143.

The plurality of valves also includes a set of valves 155a, 155b in the liquid leg conduits 145 that control flow of fluid through the liquid leg conduits. One of the valves 155a in the liquid leg conduits 145 is positioned in the upstream liquid conduit 145a (e.g., near the separator 103) and is configured to selectively open the liquid leg conduits 145 for receiving flow from the liquid outlet 109 into the upstream liquid leg conduit 145a. Further, each of the downstream liquid leg conduits 145b has a valve 155b that is configured to selectively open and close the respective downstream liquid leg conduit 145b. Thus, the valves 155b in the downstream liquid leg conduits 145b are operable to selectively route fluid flow from the upstream liquid leg conduit 145a to one or more of the multiphase flow metering systems 121, 123. For example, the valves 155b in the downstream liquid conduits 145b can be operated to switch flow through the liquid leg conduits 145 back and forth from one of the multiphase flow metering systems 121, 123 to the other to reroute the flow of fluid through the liquid leg conduits.

The plurality of valves also includes a set of valves 157a, 157b in the bypass conduits 147 that control flow of fluid through the bypass conduits. One of the valves 157a in the bypass conduits 147 is positioned in the upstream liquid conduit 147a and is configured to selectively open the bypass conduits for receiving flow directly from the petroleum wells. Further, each of the downstream bypass conduits 147b has a valve 157b that is configured to selectively open and close the respective downstream bypass conduits. Thus, the valves 157b in the downstream bypass conduits 147b are operable to selectively route fluid flow from the upstream bypass conduit 147a to one or more of the multiphase flow metering systems 121, 123. For example, the valves 157b in the downstream bypass conduits 147b can be operated to switch flow through the bypass conduits back and forth from one of the multiphase flow metering systems 121, 123 to the other to reroute the flow of fluid through the bypass conduits 147. The bypass valves 159 also include a valve 159c upstream of the separator 103 that is configured to selectively open and close the inlet 105 to the separator 103.

The system also has a control system 161 configured to control operation of the valves 151 in the fluidic system 141. The control system 161 can reside in one or more components. For example, some or all of the control system 161 can be part of or accompany a net oil computer associated with one or both of the Coriolis meters, such as the net oil computer 137 on the skid 131 illustrated in FIG. 7. Likewise, the processor 161 can be a separate component that communicates (e.g., wirelessly or through communication lines) with other components of the system. Moreover, the functions ascribed to the control system 161 herein can be divided among multiple separate processing components. The control system 161 is suitably also configured to selectively and sequentially route the output of one or more wells selected from a group of N wells to the fluidic system 141 to perform a series of well tests on the wells, for example using any convention well switching systems (not shown). Moreover, the control system 161 is suitably configured to implement multiple different measurement modes of the metering system 101 by opening and closing selected valves 151 in the fluidic system 141. More information about some of the possible measurement modes will be provided below. In general, however, the control system 161 implements different measurement modes by routing fluid from the petroleum wells through the fluidic system 141 in different ways and changing how measurements of the production fluids are taken. The control system 161 is suitably configured to select from one of several different measurement modes to match current operating conditions (e.g., flow rate into the system, gas void fraction, etc.) to the performance capabilities of the multiphase flow metering systems 121, 123. In general, the control system 161 routes fluid through the fluidic system 141 differently for each mode.

For example, the control system 161 is suitably configured to operate the bypass valves 157a, 157b, 157c to bypass the separator 103 and use one or more of the multiphase metering systems 121,123 to provide dynamic measurement of the production fluids, including near real time individual flow rate measurements for oil, water, and gas, when operating conditions are consistent with operation of the multiphase metering systems in this manner. As used herein, the phrase "dynamic measurement" refers to a measurement that provides time varying individual flow rate measurements for oil, water, and gas that can be correlated with the flow rates of the constituents into the system 101 from the well under test. Similarly, a "dynamic measurement mode" is one that provides dynamic measurements.

Conversely, the control system 161 is suitably configured to operate the valves 151 to direct fluids produced from the wells to the separator 103 when operating conditions are not conducive to use of the multiphase flow metering systems 121, 123 to provide dynamic measurements (e.g., if the gas void fraction is above a threshold amount). When a measurement mode uses the separator 103, the control system 161 operates the valves 151 to route liquids from the separator 103 to one of the multiphase flow metering systems 121, 123 through the liquid leg conduits 145 and to route gas from the separator to the other of the multiphase flow metering systems through the gas leg conduits 143. Since dynamic measurements are more desirable in most cases than non-dynamic measurements, the control system 161 is suitably configured to route all fluid flow received from the well through the bypass conduits 147 when it determines the current operating conditions allow separate flow rate measurements of oil, water, and gas through the system.

The system 101 can include one or more of several different components configured to provide information for use by the control system 161 to determine whether or not to bypass the separator 103. For example, one or more sensors can be installed in a line leading from the wells to the system 101 to provide information about the gas void fraction and/or total flow rate of fluids currently being directed into the system. The multiphase metering systems 121, 123 will also provide flow rate measurements that can be used by the control system 161 to assess total flow rate of fluid through the system 101. Moreover, the multiphase flow metering systems 121, 123 may also be able to provide information about the gas void fraction or other characteristics of the fluid flow which may be used by the control system 161 to determine which measurement mode to select and when to implement a change in the current measurement mode.

Several different measurement modes that can be implemented in connection with the system 101 illustrated in FIG. 6 are listed in Table 1 below:

TABLE 1

| | | Various Measurement Modes | | | | |
|---|---|---|---|---|---|---|
| Operating Mode | Liquid Flow Rate | Gas Void Fraction | Separator | Meter 1 (Capacity of 1-5 units) | Meter 2 (Capacity of 5-20 units) | Measurement Quality |
| 1 | 0-1 units | 0-100% | In Use | Liquid Leg | Gas Leg | Conventional |
| 2 | 1-5 units | 0-50% | Bypassed | Multiphase Flow | Not In Use | Enhanced/Dynamic |

TABLE 1-continued

Various Measurement Modes

| Operating Mode | Liquid Flow Rate | Gas Void Fraction | Separator | Meter 1 (Capacity of 1-5 units) | Meter 2 (Capacity of 5-20 units) | Measurement Quality |
|---|---|---|---|---|---|---|
| 3 | 1-5 units | 50-100% | In Use | Liquid Leg | Gas Leg | Conventional |
| 4 | 5-20 units | 0-50% | Bypassed | Not In Use | Multiphase Flow | Enhanced/Dynamic |
| 5 | 5-20 units | 50-100% | In Use | Gas Leg | Liquid Leg | Conventional |
| 6 | 20-25 units | 0-50% | Bypassed | Multiphase Flow | Multiphase Flow | Enhanced/Dynamic |

In the example set forth in Table 1, the 1st multiphase flow metering system 121 has a minimum flow rate of 1 unit and a maximum flow rate of 5 units. The 2nd multiphase flow metering system 123 has a minimum flow rate of 5 units and a maximum flow rate of 20 units. The liquid flow rate and gas void fraction columns refer to the flow rate and gas void fraction of fluids entering the system.

Mode 1—Very Low Flow Rate

In Mode 1 the control system 161 operates the valves 151 to direct fluid from the wells to the separator 103. The control system 161 is suitably configured to pick Mode 1 when the total flow rate of fluid into the system is less than the minimum flow rate for the smallest of multiphase metering systems 121. The separator 103 is used because the fluid flow rate is too low to use any of the multiphase flow metering systems 121, 123 to provide dynamic measurements. One of the metering systems 123 is used to measure gas flow from the separator 103 through the gas leg conduits 143 and the other 121 is used to measure liquid flow from the separator through the liquid leg conduits 145. As indicated in Table 1, the smaller multiphase flow metering system 121 is used to measure the liquid because the flow rate of liquid during very low flow rate into the system will better match the operating range of the smaller system and it is expected that the control strategy for operating the separator will result in periodic batches of gas being released, which can be measured by the larger system in spite of the low overall flow rate because gas will typically be released only periodically. The system output during the Very Low Flow Rate Measurement Mode provides conventional type measurements on the liquid leg and gas leg respectively. In other words, the measurements are accurate when totalized or averaged over a sufficiently long time period, but dynamic measurements are not available due to the settling time in the separator 103 and/or control strategies that may be used to control operation of the separator.

Mode 2—Low Flow Rate Dynamic

In Mode 2 the control system 161 operates the valves 151 to bypass the separator 103 and direct all flow from the wells through the bypass conduits 147 to the smallest of the multiphase flow metering systems 121. The control system 161 is configured to pick Mode 2 when the flow rate is within the operating range of the smallest multiphase flow metering system 121 and the gas void fraction is within the specifications for operation of the smaller multiphase metering system in a dynamic multiphase mode (e.g., GVF is less than a threshold value, such as about 50% or less). In the Low Flow Rate Dynamic Measurement Mode, the control system 161 directs all fluids received by the system 101 to the smallest multiphase flow metering system 121, which provides enhanced dynamic multiphase measurements.

Mode 3—Low Flow Rate Conventional

In Mode 3 the control system 161 operates the valves 151 to direct all flow received by the system 101 to the separator 103. The control system 161 is suitably configured to pick Mode 3 when the flow rate is within the specifications for the smallest multiphase flow metering system 121 but the gas void fraction is too high to use the metering systems 121, 123 to obtain dynamic measurements. One of the metering systems 123 is used to measure gas flow from the separator 103 through the gas leg conduits 143 and the other 121 is used to measure liquid flow from the separator through the liquid leg conduits 145. As indicated in Table 1 the smaller system 121 is used to measure the liquid because the flow rate of liquid through the system 101 will better match the operating range of the smaller metering system. The system output during the Low Flow Rate Conventional Measurement Mode is conventional type measurements on the liquid leg and gas leg respectively.

Mode 4—Medium Flow Rate Dynamic

In Mode 4 the control system 161 operates the valves 151 to bypass the separator 103 and direct all flow from the wells through the bypass conduits 147 to the larger of the multiphase flow metering systems 123. The control system 161 is configured to pick Mode 4 when the flow rate is within the operating range of the larger multiphase flow metering system 123 and the gas void fraction is within the specifications for operation of this system in a dynamic multiphase mode (e.g., GVF is less than a threshold value, such as about 50% or less). In the Medium Flow Rate Dynamic Measurement Mode, the control system 161 directs all fluids received by the system 101 to the larger of multiphase flow metering system 123, which provides enhanced dynamic multiphase measurements.

Mode 5—Medium Flow Rate Conventional

In Mode 5 the control system 161 operates the valves 151 to direct all flow received by the system 101 to the separator 103. The control system 161 is suitably configured to pick Mode 5 when the flow rate is within the specifications for the larger multiphase flow metering system 123 but the gas void fraction is too high to use that metering systems to obtain dynamic measurements. One of the metering systems 121 is used to measure gas flow from the separator 103 through the gas leg conduits 143 and the other 123 is used to measure liquid flow from the separator through the liquid leg conduits 145. As indicated in Table 1 the larger system 123 is used to measure the liquid because the flow rate of liquid through the system 101 will better match the operating range of the larger metering system. The system output during the Medium Flow Rate Conventional Measurement Mode is conventional type measurements on the liquid leg and gas leg respectively.

Mode 6—High Flow Rate Dynamic

In Mode 6 the control system 161 operates the valves 151 159 to bypass the separator 103 and direct all flow from the wells through the bypass conduits 147 to the multiphase flow metering systems 121, 123, which are used in parallel. The control system 161 is configured to pick Mode 6 when the flow rate is above the maximum flow rate capacity of the larger metering system 123 but within the operating range of both metering systems 121, 123 working in parallel to collectively measure all the fluid and the gas void fraction is within the specifications for operation of the metering systems in a dynamic multiphase mode (e.g., GVF is less than a threshold value, such as about 50% or less). In the High Flow Rate Dynamic Measurement Mode, all of the valves 157a, 157b in the bypass conduits 147 are open to provide maximum capacity. Meanwhile the valve 159c controlling the inlet 105 to the separator 103 is closed to prevent flow of fluid into the separator.

Figure 11:
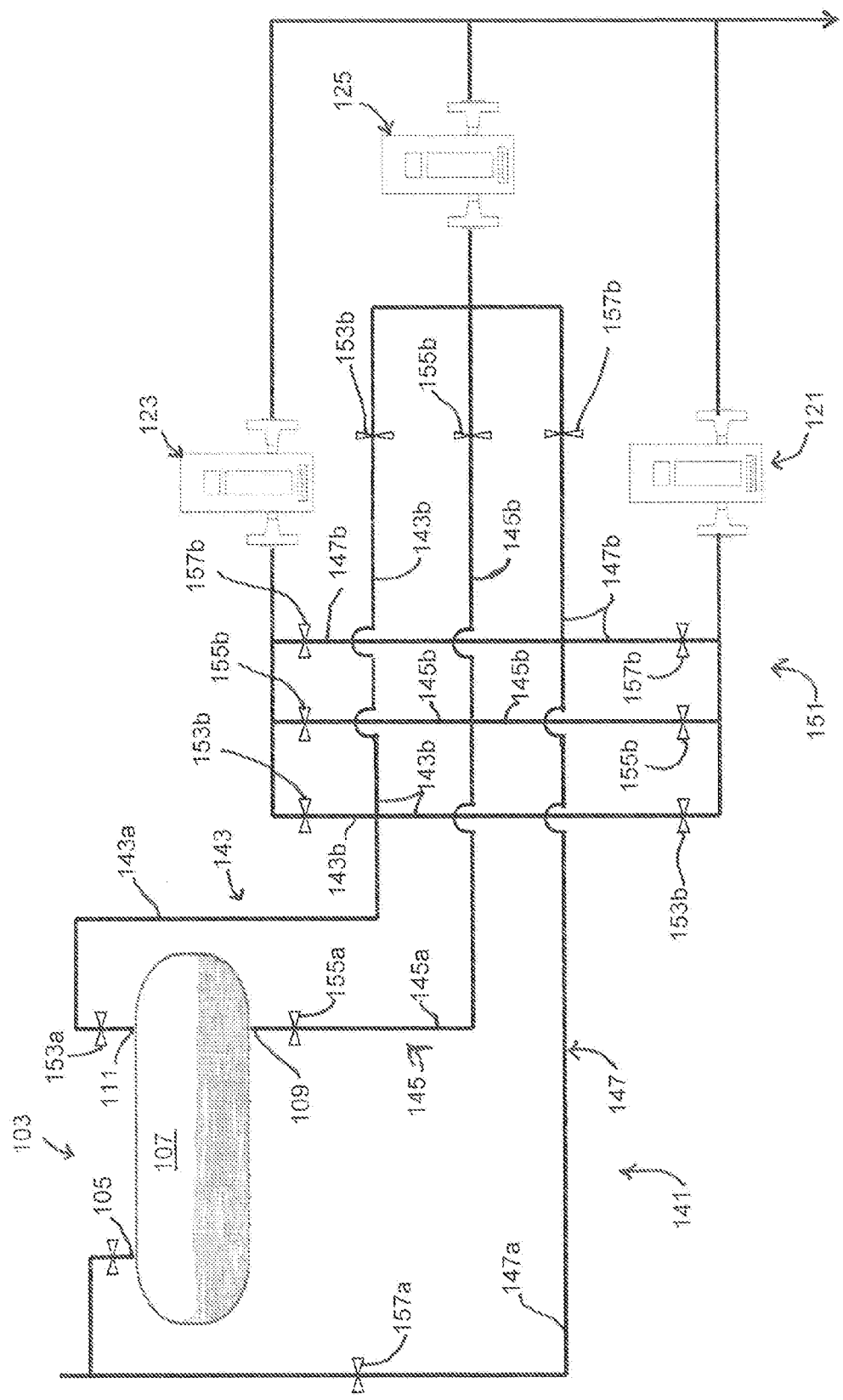
FIG. 11 is a schematic diagram illustrating another embodiment of a multiphase test system similar to the embodiment illustrated in FIG. 6 but with a third multiphase metering system included.

The various modes set forth above are provided for illustrative purposes. The cutoff points between modes, the criteria used to pick a particular mode, and the way fluid is routed through the system can be varied without departing from the broad scope of the invention. Also, the number of multiphase flow metering systems can be increased from two to three or more. For example, referring to FIG. 11 the gas leg conduits 143, liquid leg conduits 145, and bypass conduits 147 can include additional downstream conduits 143b, 145b, 147b connecting the respective upstream conduits 143a, 145a, 147a to additional multiphase flow metering systems, such as the third multiphase flow metering system 125 illustrated in FIG. 11.

The system 101 described herein allows dynamic multiphase measurements to be provided over a wide range of potential well-flow rates. Existing conventional separation-based well test systems can easily be upgraded to create the system 101 by adding the multiphase flow meters 121, 123 and conduits 143, 145, 147 to the existing systems. Moreover, the system 101 is also suitable for use in new installations. The system 101 can also provide improved robustness to gas carry under, liquid carry over, and dissolved gas breakout when the separator 103 is in because the multiphase meters 121, 123 can still provide multiphase measurements, and thereby detect presence of gas in the separated liquid and/or presence of liquid in the separated gas, even when the system is not operating in a dynamic mode. Thus, liquid carry over, gas carry under, gas breakout, and other such events can be detected by the system 101. This increased robustness can also make it reasonable to reduce the size and cost of the separator 103 because it may no longer be considered as important to achieve complete separation under the full range of operating conditions that could be encountered.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

What is claimed is:

1. A system for testing production of fluids by one or more petroleum wells, the system comprising:

a separator comprising an inlet for receiving a multiphase fluid flow from a petroleum well, a vessel for containing fluids received through the inlet, a liquid outlet, and a gas outlet, the gas outlet being positioned at a higher elevation on the vessel than the liquid outlet;

first and second multiphase flow metering systems, each of the first and second multiphase flow metering systems having the capability, over at least a portion of its operating envelope, of separately measuring flow rates of oil, water, and gas through the respective flow metering system;

a fluidic system comprising: (i) gas leg conduits fluidicly coupling the gas outlet of the separator to the first and second multiphase flowmeters; (ii) liquid leg conduits fluidicly coupling the liquid outlet of the separator to the first and second multiphase flow metering systems; (iii) bypass conduits plumbed to direct multiphase fluid through the fluidic system to the first and second multiphase flow metering systems without flowing the fluid through the separator to thereby bypass the separator; and (iv) a plurality of valves configured to selectively control routing of fluid flow though the fluidic system.

2. A system as set forth in claim 1 wherein the gas leg conduits, liquid leg conduits, and bypass conduits each comprises a first conduit configured to direct fluid to the first multiphase flow metering system and a second conduit configured to direct fluid to the second multiphase flow metering system.

3. A system as set forth in claim 2 wherein said plurality of valves includes a valve for each of the first conduits and a valve for each of the second conduits, the valves for the first and second conduits being configured to selectively open and close the respective conduit.

4. A system as set forth in claim 1 wherein the first multiphase flow metering system has a relatively higher maximum flow rate capacity and the second multiphase flow metering system has a relatively lower maximum flow rate capacity.

5. A system as set forth in claim 1 wherein at least one of the first and second multiphase flow metering systems comprises a multiphase Coriolis flowmeter.

6. A system as set forth in claim 1 wherein each of the first and second multiphase flow metering systems comprises a multiphase Coriolis flowmeter.

7. A system as set forth in claim 1 wherein each of the first and second multiphase flow metering systems comprises a multiphase Coriolis flowmeter in combination with a water cut meter.

8. A system as set forth in claim 1 further comprising a control system, the control system being configured to use the valves to implement multiple different measurement modes, wherein fluid is routed differently through the fluidic system in each of the modes.

9. A system as set forth in claim 8 wherein at least one of the measurement modes is a dynamic measurement mode in which fluid is routed through the bypass conduits to bypass the separator and at least one of the other measurement modes is a separated measurement mode in which fluid is routed to the separator for separation into liquids and gas and then liquids are routed from the separator to one of the first and second multiphase flowmeters and gas is routed from the separator to the other of the first and second multiphase flowmeters.

10. A system as set forth in claim 8 wherein the control system is further configured to:
    determine whether or not the current operating conditions allow the first and second multiphase flow metering systems, collectively or individually, to provide separate flow rate measurements of oil, water, and gas through the system; and
    route all fluid flow received from the well through the bypass conduits when the controller determines the current operating conditions allow separate flow rate measurements of oil, water, and gas through the system.

11. A system as set forth in claim 10 wherein the first multiphase flow metering system has a relatively higher maximum flow rate capacity and the second multiphase flow metering system has a relatively lower maximum flow rate capacity and wherein the control system is further configured to:
    determine a current flow rate received from the well; and
    implement a low flow rate dynamic measurement mode when: (i) the controller determines the current operating conditions allow separate flow rate measurements of oil, water, and gas through the system; and (ii) the current flow rate is below a threshold amount corresponding to the maximum flow rate capacity of the second multiphase flow metering system, wherein implementing the low flow rate dynamic measurement mode comprises operating the valves to direct substantially all fluid flow through the fluidic system to the second multiphase flow metering system via the bypass conduits, thereby bypassing the separator.

12. A system as set forth in claim 11 wherein the control system is further configured to implement a medium flow rate dynamic measurement mode when: (i) the controller determines the current operating conditions allow separate flow rate measurements of oil, water, and gas through the system; (ii) the current flow rate is above said threshold amount corresponding to a maximum flow rate capacity of the second multiphase flowmeter; and (iii) the current flow rate is below a second threshold amount corresponding to the maximum flow rate capacity of the first multiphase flowmeter, wherein implementing the medium flow rate dynamic measurement mode comprises operating the valves to direct substantially all fluid flow through the fluidic system to the first multiphase flow metering system via the bypass conduits, thereby bypassing the separator.

13. A system as set forth in claim 12 wherein the control system is further configured to implement a high flow rate dynamic measurement mode when: (i) the controller determines the current operating conditions allow separate flow rate measurements of oil, water, and gas through the system; and (ii) the current flow rate is above said second threshold amount, wherein implementing the high flow rate dynamic measurement mode comprises operating the valves to direct substantially all fluid flow through the bypass conduits to the first and second multiphase flow metering systems so the first and second multiphase flow metering systems collectively meter all fluid flow through the system, thereby bypassing the separator.

14. A system as set forth in claim 8 wherein the control system is further configured to:
    determine whether or not the current operating conditions allow the first and second multiphase flow metering systems, collectively or individually, to provide separate flow rate measurements of oil, water, and gas being output by the well; and
    route all fluid flow received from the well to the separator when the current operating conditions do not allow separate flow rate measurements of oil, water, and gas by the first and second multiphase flow metering systems.

15. A system as set forth in claim 14 wherein the control system is configured to determine whether or not the current operating conditions allow the first and second multiphase flow metering system, collectively or individually, to provide separate flow rate measurements of oil, water, and gas being output by the well by comparing a current measured gas void fraction of fluid from the well to one or more threshold values corresponding to maximum gas void fractions for which the first and second multiphase flow metering systems are operable to provide separate flow rate measurements of oil, water, and gas being output by the well.

16. A system as set forth in claim 14 wherein the control system is configured to direct fluid from the gas outlet through the gas conduits to one of the first and second multiphase flow metering systems and to direct fluid from the liquid outlet through the liquid conduit to the other of the first and second multiphase flow metering systems so one of the first and second flow metering systems is used to meter separated gas and the other of the first and second flow metering systems is used to meter separated liquid when the control system determines the current operating conditions do not allow the first and second multiphase flow metering systems to provide separate flow rate measurements of oil, water, and gas.

17. A system as set forth in claim 8 wherein the control system is configured to:
- determine whether or not a set of current operating conditions allows the first and second multiphase flow metering systems, collectively or individually, to provide separate flow rate measurements of oil, water, and gas being output by the well; and
- use one or more of the first and second multiphase flow metering systems to provide separate dynamic flow rate measurements for oil, water, and gas when the controller determines the current operating conditions allow separate flow rate measurements of oil, water, and gas being output by the well.

18. A system as set forth in claim 1 further comprising a third multiphase flow metering system, wherein the gas leg conduits fluidicly couple the gas outlet of the separator to the third multiphase flow metering system, the liquid leg conduits fluidicly couple the liquid outlet of the separator to the third multiphase flow metering system, and the bypass conduits are plumbed to direct multiphase fluid from the petroleum well to the first, second, and third multiphase flow metering systems without flowing the fluid through the separator to thereby bypass the separator.

19. A system as set forth in claim 18 further comprising a control system, the control system being configured to use the valves to implement multiple different measurement modes, wherein fluid is routed differently through the fluidic system in each of the modes, and wherein at least three of the measurement modes are dynamic measurement modes in which fluid is routed through the bypass conduits to bypass the separator and allow for measurement of substantially instantaneous individual flow rates for oil, water, and gas by different combinations of the first, second, and third multiphase flow metering systems.

20. A system as set forth in claim 1 further comprising a control system configured to selectively and sequentially route the output one or more wells selected from a group of N wells to the fluidic system to perform a series of well tests on the wells.

* * * * *